United States Patent [19]

Luckachina

[11] Patent Number: 4,566,659
[45] Date of Patent: Jan. 28, 1986

[54] PIVOTABLE SUPPORT RESCUE HOIST

[75] Inventor: John C. Luckachina, Shelton, Conn.

[73] Assignee: The United States of America as represented by the Secretary of the Navy, Washington, D.C.

[21] Appl. No.: 662,122

[22] Filed: Oct. 18, 1984

[51] Int. Cl.⁴ .................... B64C 1/22; B64D 9/00
[52] U.S. Cl. .................... 244/137 R; 441/83; 248/291; 414/540; 254/380; 254/332
[58] Field of Search ............ 244/137 R, 137 P, 118.1; 114/373, 210; 441/83; 414/540, 54 L; 254/380, 332; 248/291

[56] References Cited

U.S. PATENT DOCUMENTS

| | | | |
|---|---|---|---|
| 2,554,804 | 5/1951 | Amundson | 114/210 |
| 2,700,525 | 1/1955 | Mears | 248/291 |
| 2,910,032 | 10/1959 | Kanouse | 254/332 |
| 2,969,417 | 1/1961 | Weller | 248/291 |
| 3,088,608 | 5/1963 | Theodore | 244/137 R |
| 3,628,759 | 12/1971 | Kuedlik | 248/291 |
| 4,511,122 | 4/1985 | Svendsen | 254/332 |

*Primary Examiner*—Galen L. Barefoot
*Attorney, Agent, or Firm*—Robert F. Beers; Arthur A. McGill; Michael J. McGowan

[57] ABSTRACT

A pivotable support mechanism for an aircraft rescue hoist or the like. The upright position provides sufficient structural strength to support objects to be lifted by the hoist. The swing-away position provides clearance for access to other equipment without requiring removal of the hoist from the aircraft.

2 Claims, 3 Drawing Figures

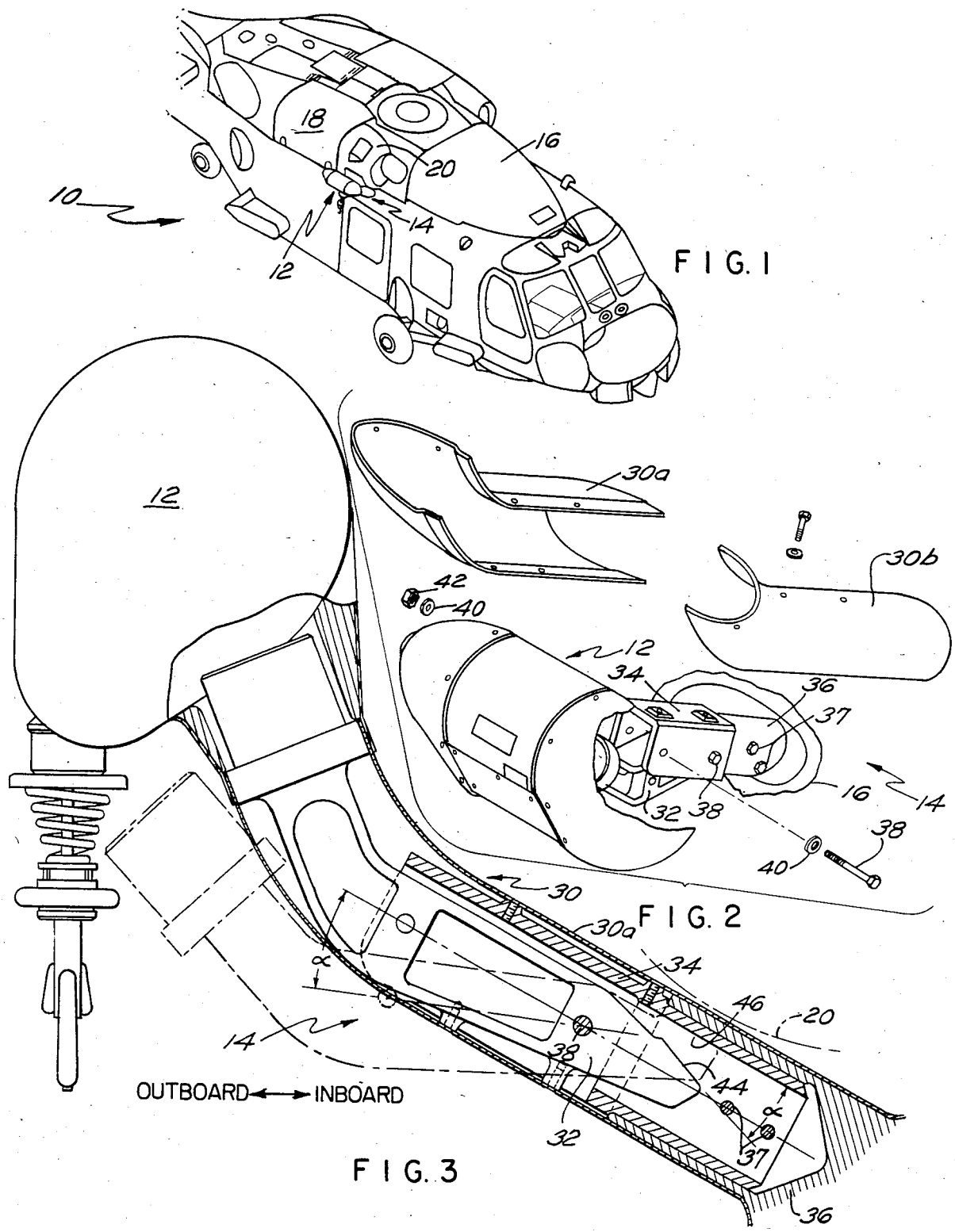

PIVOTABLE SUPPORT RESCUE HOIST

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to structural supports and more particularly to a pivotable support for the rescue hoist of a helicopter which permits convenient access to an aircraft's engine inlet cover for maintenance or repair purposes.

(2) Description of the Prior Art

Previous hoist supports were of a fixed tubular cross section. In order to repair or perform maintenance on the adjacent engine inlet section, the rescue hoist and the support had to be completely removed in order to provide access and sufficient clearance for engine cover removal. Such hoist removal requires at least two men and considerable man hours of labor.

SUMMARY OF THE INVENTION

Accordingly, it is a general purpose and object of the present invention to provide a pivotable support arm for a rescue hoist.

It is a further object that such support arm have an upright position which provides structural support for, and permits routine operation of, the hoist.

Another object is that such support arm have an extended or downward position which provides clearance for removal of acess covers on adjacent components.

These object are accomplished with the present invention by providing a support structure for pivotably mounting a rescue hoist on the main structural frame of a helicopter. The structure comprises an airframe flange, fixedly attached to the main structure, which provides a female tubular mounting protrusion for the support structure. A support member is fixedly attached to the airframe flange, the support member having a male tubular protrusion on one end and a channel like protrusion on the opposite end. The male protrusion is slidably engaged with in the tubular female protrusion and is oriented such that the channel opening faces generally downward. A first fastening means attaches to the male and female protrusions fixedly connecting them together. A support arm is then pivotably attached to the channel like protrusion in such a way as to permit the arm to swing in a vertical plane through a predetermined angle α. A second fastening means connects the support arm to the support member channel while providing a pivot point for the support arm. A third fastening means connects the support member to the channel only when the support arm is in its full upright position which, in conjuction with the second fastening means, secures the rescue hoist in its operational upright position.

A more complete understanding of the invention and many of the attendant advantages thereto will be readily appreciated as the same becomes better understood by reference to the following detailed description when considered in conjuction with the accompanying drawings wherein:

BRIEF DESCRIPTION OF THE DRAWINGS

FIG. 1 shows a helicopter having a pivotable rescue hoist mounted on a support arm in close proximity to an engine inlet.

FIG. 2 shows an exploded view of the pivotable support arm of FIG. 1.

FIG. 3 shows a longitudinal cross sectional view of the support arm of FIG. 2.

DESCRIPTION OF THE PREFERRED EMBODIMENT

Referring now to FIG. 1 there is shown a pivotable support system 10 further comprising a hoist mechanism 12 suitable for lifting operations or the like, which is attached to the outer end of a support assembly 14. The other, inboard end of support assembly 14 is fixedly attached to a main structural support of helicopter 16, being positioned in close proximity to one of the aircraft's main engines generally identified as 18. Engine 18 has an inlet cover 20 which requires removal periodically for maintenance and/or repair. At that time sufficient access must be provided to permit such removal of inlet cover 20 despite the encumbering presence of hoist 12.

FIG. 2 shows a more detailed, partially exploded view of rescue hoist 12 and support assembly 14. Assembly 14 further comprises a split, two part fairing 30a and 30b shown removed from the support structure. Fairing 30 serves to protect and to provide low aerodynamic drag during helicopter flight. Hoist 12, shown in its lowered or outboard position, is fixedly attached to support arm 32, the other end of which pivotably attaches to support member 34. Member 34 in turn fixedly attaches to airframe flange 36 by means of fasteners 37. Flange 36 is integral with one of the main structural frames of aircraft 16. Support arm 32 is held in it upright or inboard position with respect to member 34 by means of inboard and outboard fasteners, each fastener comprising a bolt 38, a washer 40 and a nut 42. The shank of inboard bolt 38 serves as the pivot for support arm 32 when the outboard fastener is removed as shown in this figure placing the hoist in its lowered position. It is noted that the single inboard fastener is capable of supporting hoist 12 while in the lowered position as no external loads other than hoist weight is then present. In order to lift an external load however, hoist 12 must be in its upright position and be firmly secured by both fasteners. Note further that the outboard end of member 34 further comprises a channel shaped protrusion, the channel opening facing generally downward. This channel provides clearance for support arm 32 as it is swung through an arc of preselected length.

FIG. 3 shows a longitudinal cross sectional view of system 10. A cylindrical male protrusion on the inboard end of member 34 is shown slidably inserted within a corresponding protruding cylindrical receptacle which is and integral part of flange 36. The hollow male protrusion of member 34 receives the inboard end of support arm 32, which end has machined thereon a shaped surface 44 oriented at an angle α with respect to the common axis of two fastener holes through member 32. Upon removal of split fairing 30 and the outboard bolt 38, arm 32 is free to pivot on inboard bolt 38 through an angle α until surface 44 contacts the internal faying surface 46 of the hollow male protrusion of member 34. This position provides the necessary support for the weight of hoist 12 in its outboard position. One man can thus pivot hoist 12. It is noted that while support arm 32 is shown to be "V" shaped, the arm may also be curved or straight without deviating from the teachings herein.

The primary advantages of the pivotable support mechanism over the fixed position supports used previously is the savings in total labor hours needed for maintenance and repair, and that one man alone can perform the operation.

What has thus been described is a support structure for pivotably mounting a rescue hoist on the main structural frame of a helicopter. The structure comprise an airframe flange, fixedly attached to the main structure, which provides a female tubular mounting protrusion for the support structure. A support member is fixedly attached to the airframe flange, the support member having a male tubular protrusion on one end and a channel like protrusion on the opposite end. The male protrusion is slidably engaged within the tubular female protrusion and is oriented such that the channel opening faces generally downward. A first fastening means attaches to the male and female protrusions fixedly connecting them together. A support arm is then pivotably attached to the channel like protrusion in such a way as to permit the arm to swing in a vertical plane through a predetermined angle $\alpha$. A second fastening means connects the support arm to the support member channel while providing a pivot point for the support arm. A third fastening means connects the support member to the channel only when the support arm is in its full upright position which, in conjunction with the second fastening means, secures the rescue hoist in its operational upright position.

Obviously many modifications and variations of the present invention may become apparent in light of the above teachings. For example: The invention is not limited to use with a hoist or even an aircraft; any mechanism which may limit access to other equipment may benefit. Materials used are a design choice as is the swing angle $\alpha$, and fastener strength and quantity.

In light of the above, it is therefore understood that within the scope of the appended claims, the invention may be practiced otherwise than as specifically described.

What is claimed is:

1. A support structure for pivotably mounting a rescue hoist on the main structure of a helicopter, comprising:

an airframe flange, fixedly attached to said main structure, for providing a cylindrical mounting protrusion for said support structure;

a support member, fixedly attached to said airframe flange, said support member having a male cylindrical protrusion on one end thereof and a channel shaped protrusion on the opposite end thereof, said male protrusion being slidably engaged within said mounting flange protrusion and oriented such that said channel shaped protrusion opens generally downward;

a first fastening means, attached through said male protrusion and said mounting flange protrusion, for fixedly connecting them together;

a support arm, pivotably attached to said support member within said channel protrusion, for permitting said arm to swing in a vertical plane through an arc of predetermined angle $\alpha$;

a second fastening means, connecting said support arm to said support member channel protrusion, for providing a pivot member for said support arm;

and a third fastening means, connecting said support arm to said support member channel protrusion when said support arm is in its full upright position, for supporting and securing, in conjunction with said second fastening means, said rescue hoist in its operable position.

2. A support structure according to claim 1 further comprising a removable split fairing for enclosing said support arm and said support member in said upright position, said fairing providing low aerodynamic drag for said structure during flight.

* * * * *